H. L. BEACH.
Scroll-Sawing Machine.
No. 209,153. Patented Oct. 22, 1878.
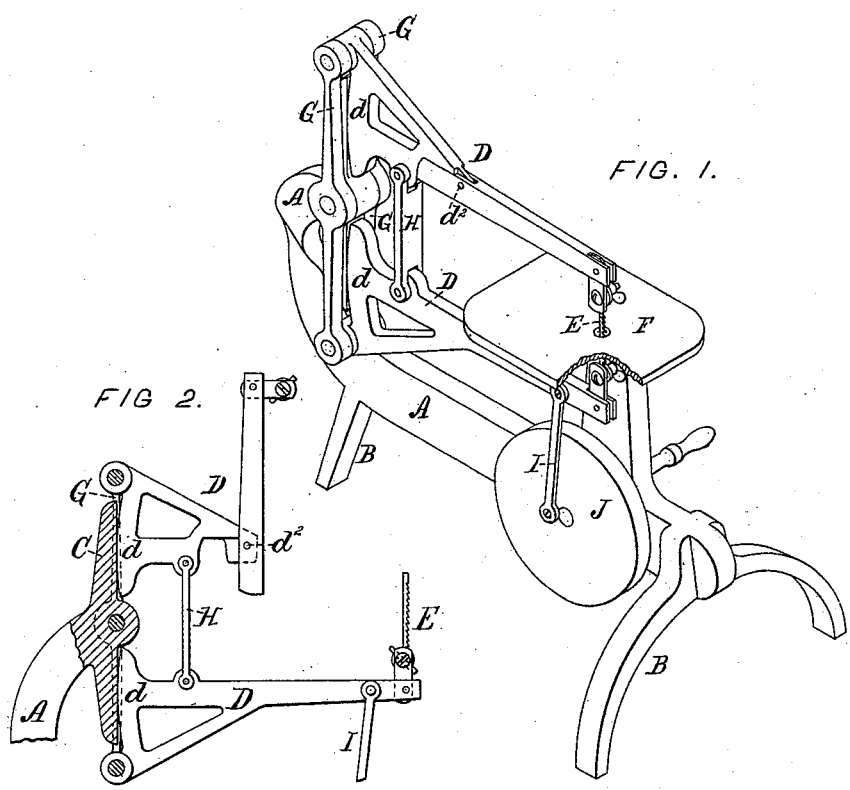

UNITED STATES PATENT OFFICE.

HENRY L. BEACH, OF MONTROSE, PENNSYLVANIA.

IMPROVEMENT IN SCROLL-SAWING MACHINES.

Specification forming part of Letters Patent No. 209,153, dated October 22, 1878; application filed September 27, 1878.

*To all whom it may concern:*

Be it known that I, HENRY L. BEACH, of Montrose, Susquehanna county, Pennsylvania, have invented, made, and applied to use Improvements in the Construction of Scroll-Sawing Machines; and that the following is a full, clear, and correct description of the same, reference being had to the accompanying drawings, making part of this specification, and to the letters of reference marked thereon, in which—

Figure 1 is a side elevation of my improved scroll-sawing machine. Fig. 2 is a view of the upper portion of the same, showing the means employed to operate the saw.

In the drawings like parts of the invention are pointed out by the same letters of reference.

The nature of the present invention relates more particularly to the means employed to operate the saw, by which, from the rocking motion of the levers, to the forward ends of which the saw is attached, a vertical reciprocating movement of the saw is obtained.

The object of the invention is the production of a scroll-sawing machine simple in construction, easily operated, and afforded at a low cost.

To enable those skilled in the arts to make and use my invention, I will describe its construction and operation.

A shows a frame for supporting the operative parts of the machine, supported by the legs B. The rear portion of the frame A is curved upward, and forms a support for the back post C, against which the curved ends of the levers D have their bearing. D shows the levers for operating the saw E. These levers D are so positioned relatively to the table F of the machine that the forward end of one is above the table and the forward end of the other below the table. Their rear ends are curved, as at $d$, and have their bearing against the face of the back post C. Their forward ends are slotted or otherwise constructed to receive the clamping device for clamping the saw E at its top and bottom ends. The upper lever is made in two parts, the curved end having its bearing against the face of the back post, and the forward portion of it pinned, as at $d^2$, so that it can be raised from the horizontal position it occupies when the machine is in operation into a vertical or nearly vertical position, as shown in Fig. 2 of the drawings, and thus facilitate the removal of the finished work by raising it over the upper end of the saw. G show bars employed to hold the levers D in place at all points of the stroke of the saw. These bars are placed upon each side of the back post C, are secured centrally to the frame A, and have their upper and lower ends attached to the levers D by means of bolts and nuts, or in any convenient manner. By their employment the curved ends of the levers are caused to bear upon the back post and rock freely upon the same. H shows a bar connecting the levers D together, so that in case the saw should break they will retain a rigid position, so to speak. The saw is also strained against this bar H. The lower lever is connected by a pitman, I, to a wheel, J, and as the same revolves motion is communicated through the pitman I to the lower lever, and through it to the upper lever, connected to it as shown. E shows the saw, having its ends clamped to the upper and lower levers, and the table of the machine through which the saw passes is designated by F.

Such being the construction, the operation is as follows: The saw E, as stated, is clamped in the forward ends of the levers D. Motion is then imparted to the lower lever through the pitman, or in any convenient manner, by which a rocking motion is given to the curved ends $d$ of the levers D and a vertical reciprocating motion to the saw E clamped in the forward ends of these levers.

A scroll-sawing machine thus constructed can be afforded at a low cost to the consumer, and will be found easy of operation and not liable to get out of order.

While I have shown the levers D provided with curved ends made of one piece, as in the case of the lower lever, I am aware that these curved ends may be formed separately and attached to the rear portions of the levers in any convenient way in machines to be driven by power. This manner of constructing the levers would be preferable.

Having now set forth my invention, what I claim as new is—

1. In a scroll-sawing machine, the combination of the following elements: a frame, A, provided with a back post, C, the levers D, having their rear ends curved, as at $d$, a saw, E, and the bars G, constructed and operating substantially as and for the purpose specified.

2. In a scroll-sawing machine, the combination of the following elements: a frame, A, provided with a back post, C, the levers D, having their rear ends curved, as at $d$, a saw, E, the bars G, and the bar H, constructed and operating substantially as and for the purposes set forth.

HENRY L. BEACH.

In presence of—
 WM. A. CROSSMON,
 WILLIAM V. H. HICKS.